F. L. STUART.
SYSTEM OF CONVEYING AND DELIVERING MATERIAL TO CARRIERS.
APPLICATION FILED FEB. 17, 1921.
1,422,493.
Patented July 11, 1922.
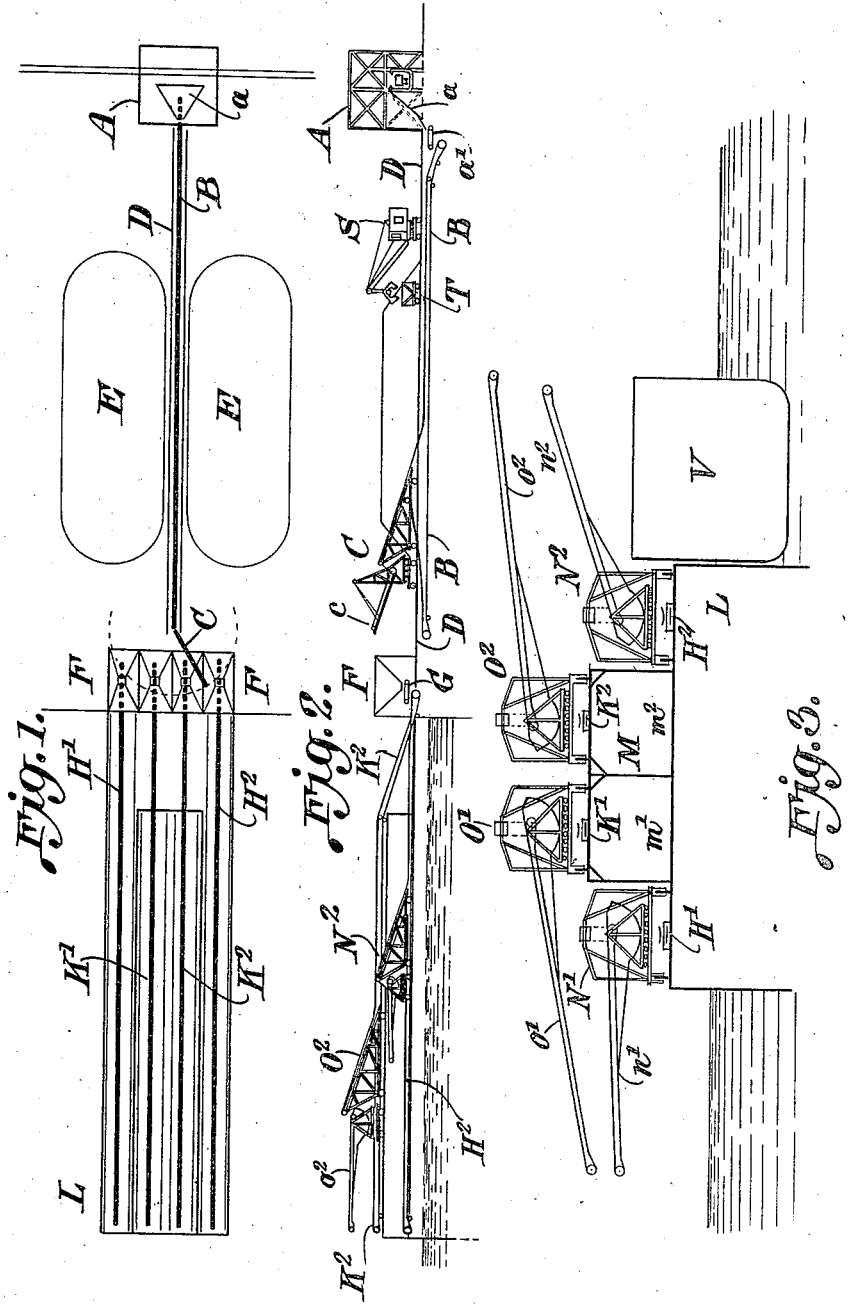
INVENTOR.
Francis Lee Stuart
BY HIS ATTORNEYS

UNITED STATES PATENT OFFICE.

FRANCIS LEE STUART, OF NEW YORK, N. Y.

SYSTEM OF CONVEYING AND DELIVERING MATERIAL TO CARRIERS.

1,422,493.	Specification of Letters Patent.	Patented July 11, 1922.

Application filed February 17, 1921. Serial No. 445,606.

*To all whom it may concern:*

Be it known that I, FRANCIS LEE STUART, a citizen of the United States, residing at New York, in the county of New York and State of New York, have invented certain new and useful Improvements in Systems of Conveying and Delivering Material to Carriers, of which the following is a specification.

This invention relates to apparatus whereby material, such as coal, ore and the like, may be conveyed from a source of supply, such as a car dumper, to storage piles or bins or to machines which discharge the material into vessels or other carriers, and the object of my invention is to provide a system by which material may be taken from the sources of supply and delivered to storage piles or bins, or may be delivered to any one of a plurality of conveyers which deliver to a plurality of loading machines supported on parallel tracks in such manner that they may be moved from place to place on a pier or in a yard without interference with each other and may deliver when desired without disturbing the other machines with which they are associated.

In carrying out my invention I preferably provide a single conveyer belt which receives material from a car dumper and delivers it by means of a stacker to storage piles or bins or to any one of a series of conveyer belts arranged side by side on a pier or in a yard. Some of these conveyer belts are supported on the same ground level and some are elevated above the others. Each of said belts is associated with a loading machine which may be moved from place to place on its track and may deliver in any desired horizontal or vertical plane to the vessel or carrier to be loaded.

A locomotive crane is also provided by means of which material may be taken from the storage piles and delivered through a traveling hopper to the main conveyer belt which may thus convey material from the piles through an intermediate machine and belts to the loading machines when the car dumping apparatus is not in operation.

In the accompanying drawings:

Figure 1 is a plan view of a conveying and loading system embodying my improvements.

Figure 2 shows a side elevation of the apparatus illustrated in Figure 1.

Figure 3 is an end view of the same on an enlarged scale.

A car dumper A of any usual kind delivers by a chute $a$ to a short feed belt $a'$ in turn delivering to an endless main conveyer belt B reeved in a stacker C of well known construction, the tripper of which delivers to a boom conveyer $c$. The stacker is adapted to move back and forth on a track D parallel with the conveyer belt B. The stacker may deliver to storage piles E on opposite sides of the belt or to any one of a series of hoppers F delivering to short feed belts G in turn discharging onto the conveyer belts $H'$, $H^2$, $K'$, $K^2$ supported on a pier or dock L. The outside belts $H'$, $H^2$ are on the same level, while the belts $K'$, $K^2$ are on an elevated structure M between the belts $H'$ and $H^2$. In Figure 3 spaces $m'$, $m^2$ are indicated in the structure which may be used for storage purposes.

Associated with each of the conveyer belts $H'$, $H^2$, $K'$, $K^2$ are loading machines $N'$, $N^2$, $O'$, $O^2$, each adapted to travel back and forth over one of the belts. Each such loading machine is reeved in the belt with which it is associated to provide a tripper and each tripper delivers to a conveyer carried by an arm $n'$, $n^2$, $o'$ or $o^2$ which is adapted to be moved about both vertical and horizontal axes.

It will thus be seen that material may be conveyed from the car dumper A to the conveyer belts on the pier and discharged by means of the boom conveyers of the loading machines. If the car dumper is in operation and it is not desired to load vessels, the material may be discharged by the stacker into the piles E.

If there are vessels at the pier to be loaded and there are no cars coming in then material can be taken from the piles E by means of a suitable reclaimer such as a locomotive crane S which may gather the material from the piles and discharge it into a traveling hopper T. It will be understood that the locomotive crane and the hopper may be moved along the track D to any suitable position and that the material received by the belt B from the hopper T is conveyed to the stacker and by the stacker delivered to the hoppers F, which in turn supply the conveyer belts that feed the loaders.

It will be understood by reference particularly to Figure 3 that the loading machines may be moved back and forth on their tracks without interference with each other. For instance, the machines on the lower tracks with their arms extended can pass under the arms of the loaders on the inside tracks and in like manner the loaders on the elevated tracks may be moved past the loaders on the outside tracks without interference therewith. Inasmuch as the discharging arms of the loading machines are of different lengths, they may be made to deliver to vessels tied up to the pier whichever conveyer belt is in operation.

It will also be observed that there is no interference of the arms of the loading machines while they are being swung and the conveyers carried by these arms may deliver to any portion of a vessel being loaded. The arms $o'$, $o^2$ of the loading machines $O'$, $O^2$ are of such length that they extend over the loading machines $N'$, $N^2$ a sufficient distance to load vessels tied to the pier and each arm $o'$ or $o^2$ is also of such length that it may be made to supply a vessel on either side of the pier. For instance, the arm $o^2$ may be swung over the belt $K'$ and over the loading machine $N'$ and made to discharge material to a vessel. At no time will the several arms interfere with the shifting of the loading machines on their tracks from one end of the pier to the other. Furthermore the loading machines on the elevated tracks may be moved freely back and forth over the conveyer belts $K'$, $K^2$ without interference with any machines such as unloading machines that may be stationed on the tracks $H'$, $H^2$, and yet these inner loading machines may deliver material on either side of the pier or at any desired place. In this way some of the belts in the group may be used to deliver material and some to receive it and carry it inshore.

I claim as my invention:

1. A system of loading material carriers, comprising a conveyer for carrying material from a source of supply, a plurality of parallel conveyers adapted to receive material therefrom and supported in different horizontal planes, and loading apparatus around parts of which said last mentioned conveyers are reeved.

2. A system of loading material carriers, comprising a conveyer for carrying material from a source of supply, a plurality of parallel conveyers adapted to receive material therefrom and supported in different horizontal planes, and loading apparatus around parts of which said last mentioned conveyers are reeved and provided with means for discharging material in different vertical and horizontal planes.

3. A system of loading material carriers, comprising a conveyer for carrying material from a source of supply, a delivering apparatus connected with said conveyer, a plurality of conveyers onto which said delivering apparatus discharges the material, and loading apparatus associated with said conveyers and which have discharging conveyers of different lengths mounted to turn about both vertical and horizontal axes.

4. A system of loading material carriers, comprising a conveyer for carrying material from a source of supply, a plurality of conveyers receiving material therefrom supported in different horizontal planes, a delivering apparatus for discharging material from the first mentioned conveyer onto the conveyers last mentioned, loading machines, some of which are mounted to travel in the same horizontal plane and others in a horizontal plane above those first mentioned, and each of which loading machines is provided with a delivery conveyer mounted to turn about both vertical and horizontal axes.

5. A system of loading material carriers, comprising a main conveyer for carrying material from a source of supply, a reclaimer for gathering material and depositing it on said conveyer, a plurality of conveyer belts, a series of hoppers delivering to said belts, a machine associated with the main conveyer and delivering to any of said hoppers, and loading machines associated with said conveyer belts receiving material therefrom in different horizontal planes, and provided with means for discharging the material in any desired vertical or horizontal plane.

6. A system of handling material, comprising a source of supply, a plurality of conveyers arranged in a group, means for feeding the several conveyers with material, a series of loading machines associated with said conveyers, and means for delivering material from the loading machines on either side of the group of conveyers.

7. A system of loading material carriers, comprising a source of material supply, a series of conveyer belts arranged side by side in different horizontal planes, loading machines associated with said conveyer belts having arms equipped with conveyers for delivering material, and other loading machines associated with said belts and provided with longer arms equipped with conveyer belts for discharging material from said machines.

8. A system for handling material, comprising a source of material supply, a plurality of conveyers arranged in a group, a series of loading machines associated with said conveyers and movable from place to place while in operative relation with said conveyers and without interference with each other or with other machines, and means for delivering material on each side of the group from one or more of the inner machines of the group.

In testimony whereof, I have hereunto subscribed my name.

FRANCIS LEE STUART.